Nov. 23, 1954　　　C. R. FERGUSON　　　2,695,238
PACKAGE AND METHOD OF MAKING THE SAME
Filed Feb. 20, 1953　　　3 Sheets-Sheet 1

INVENTOR.
Clinton R. Ferguson
BY J. Stanley Churchill
ATTORNEY

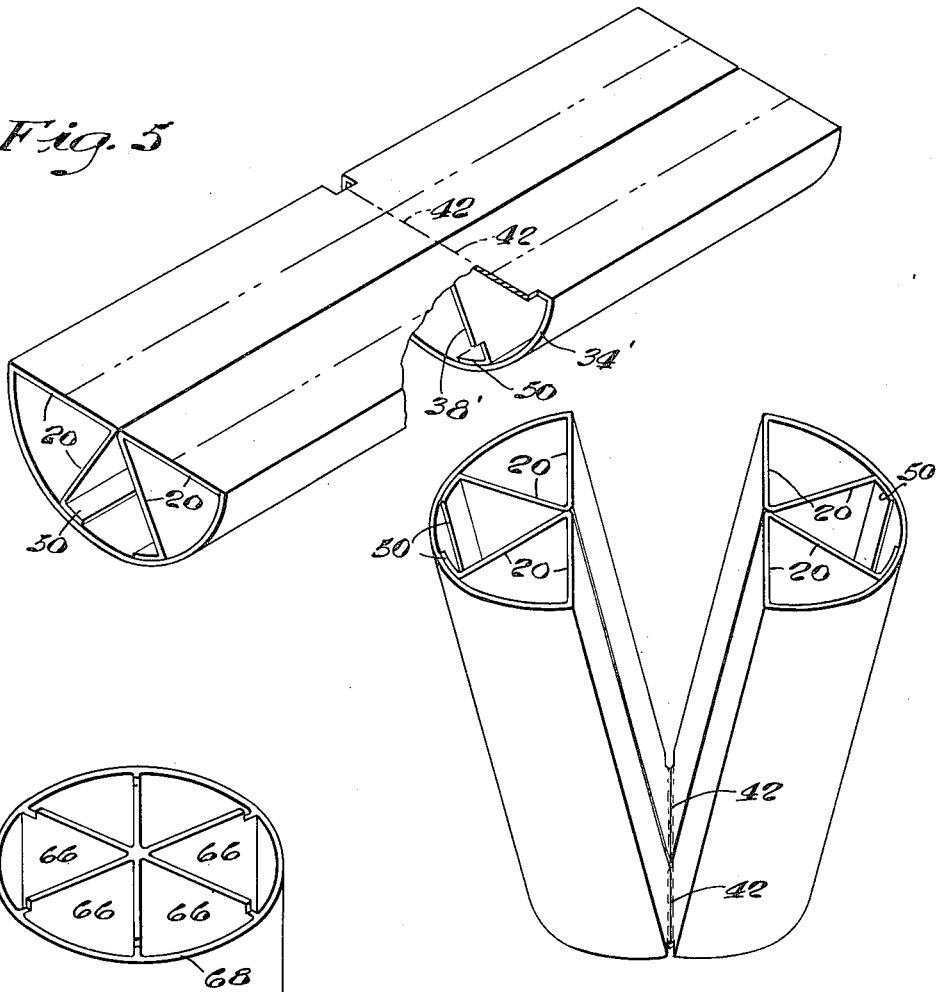

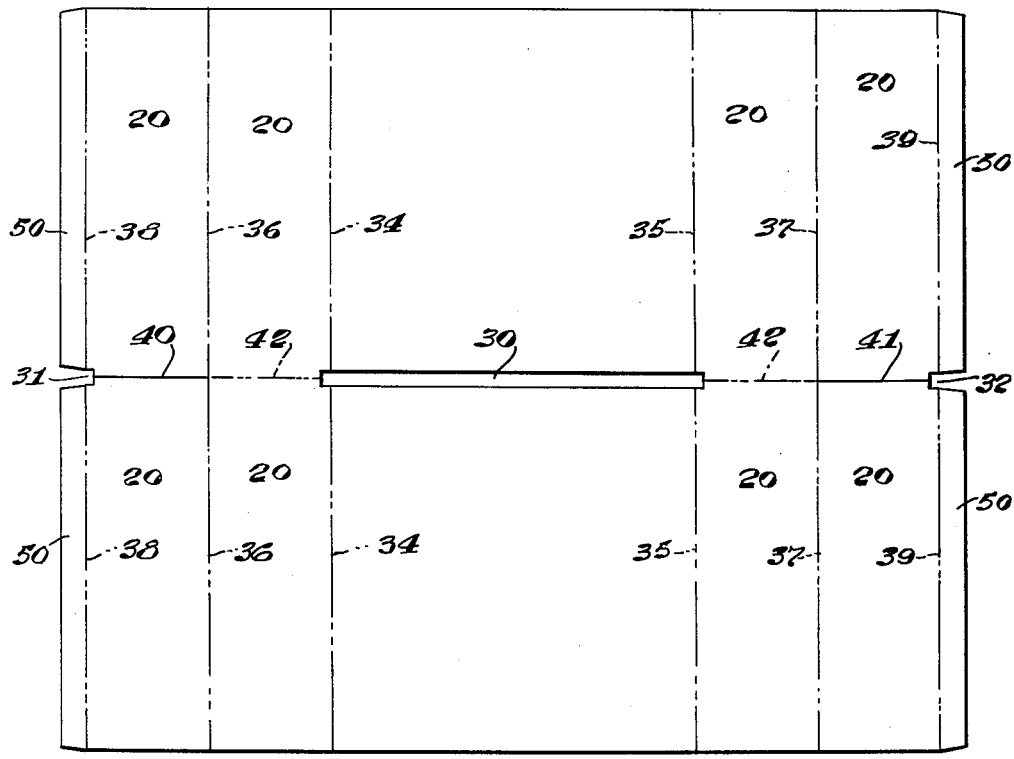

United States Patent Office 2,695,238
Patented Nov. 23, 1954

2,695,238

PACKAGE AND METHOD OF MAKING THE SAME

Clinton R. Ferguson, Wollaston, Mass.

Application February 20, 1953, Serial No. 338,029

1 Claim. (Cl. 99—171)

This invention relates to a novel package and particularly a novel coffee package and to a method of making the same.

One object of the invention is to provide a novel package comprising a container and a multi-compartment lining unit insertable into the container through an open end thereof and which is of a structure such as to enable all of the compartments to be simultaneously filled with a commodity and the outer container closed to form a filled package from which the contents of the individual compartments may be successively dispensed through openings formed in an end of the outer container.

A further object of the invention is to provide a novel airtight package particularly useful as a coffee package wherein the outer container may and preferably will comprise an air-impervious container, such as a metal container having a multi-compartment lining unit inserted therein through an open end thereof prior to closing of the same by an end closure, to subdivide the interior of the container into a plurality of separate, axially extended compartments open at one end to permit simultaneous filling thereof with the coffee or other commodity. This form of coffee package may be sold and used with advantage by institutions, restaurants and others where the contents of successive compartments are, in normal operation, used during the course of a few days.

A still further object of the invention is to provide a novel method of making the present package.

With these general objects in view and such others as may hereinafter appear, the invention consists in a coffee package hereinafter described and particularly defined in the claim at the end of this specification.

While in its broader aspects the invention contemplates a novel package embodying a container which may or may not be formed of air-impervious material, and within which commodities other than coffee may be used with advantage, nevertheless the invention finds particular utility as a coffee package wherein the container is of air-impervious material, and preferably comprises a metal container with its ends closed in an airtight manner to enable the coffee to be packaged under vacuum or pressure. For purposes of illustration the invention will be described as a coffee package embodying such a metal container.

The commercial practice in many institutions, restaurants, and the like is to buy coffee in small bags, usually containing a fraction of a pound, as for example ⅛ or ¼ of a pound, depending upon the coffee-making apparatus used by the particular customer in the normal course of his business. In other words, the operator in the restaurant or other institution deposits the contents from these small paper bags of coffee into the coffee maker to enable a definite quanity of coffee to be made of the requisite strength. At the present time substantial difficulty is experienced incidental to the packaging of coffee in these small paper bags because of the difficulty in keeping the coffee fresh when it is necessary to ship the bags to distant points where the coffee may not be used for substantial lengths of time. The packaging of small units or amounts of coffee corresponding to, for example, ⅛ or ¼ of a pound in the usual type of vacuum or pressure type of metal container, which has now come to be employed for the sale and shipment of pound and multi-pound units of coffee, is not economically feasible on account of the competition with the small-unit paper-bag package above referred to.

The present package has been developed primarily in order to enable coffee to be packaged economically in a manner such as to enable shipment thereof in an airtight container and at the same time to enable the customer to dispense from the container a fractional and predetermined amount or proportion of the contents of the container. The present package may be used with advantage in institutions, restaurants and other places where the total contents of the airtight container may be used up within a day or two after the airtight container is initially opened and at the same time to enable the unitary fractional parts of the total contents to be conveniently dispensed from the container. The present package is characterized by the provision of a preformed liner which subdivides the interior of the container into a series of axially extended compartments, preferably of equal volume, which may be made as a unit in an economical and practical manner to be introduced into a metal can or container through one of its open ends and prior to the application of any usual or preferred end closure therefor. The liner is designed to enable all of the compartments to be simultaneously filled on existing machinery exactly as the unlined can can be filled, and in practice this may be conveniently accomplished in a vacuum filling machine preferably designed to form a so-called "tightly filled package" as distinguished from "slack filled package." After the lined container has been filled, it is closed in accordance with the usual methods by an end closure. One end closure of the container has provision for identifying the different compartments so that by the use of a special tool or opener it is possible to conveniently open successive compartments to enable the contents of a compartment to be dispensed or shaken from the container or can through the opening in the end closure. The novel lining unit has been designed to prevent the passage or seepage of the coffee within the container from one compartment to the other during shipment and at the same time permit the contents of each compartment to be delivered to the customer at a price which is competitive with the price of the ordinary small-unit paper-bag package now used. At the same time the additional advantage of airtight shipment of the total contents is assured and until one compartment is opened.

Fig. 5 is a perspective view of the container liner in an intermediate stage of assembly.

Fig. 6 is a perspective view of the liner assembly of Fig. 5 being folded into final assembled form.

Fig. 7 is a partial perspective showing of the upper end of the liner in final assembled form.

Fig. 8 is a perspective showing of an alternative form of liner.

Fig. 9 is a plan view of the blank form for the liner of Figs. 5 through 7.

Figure 1:
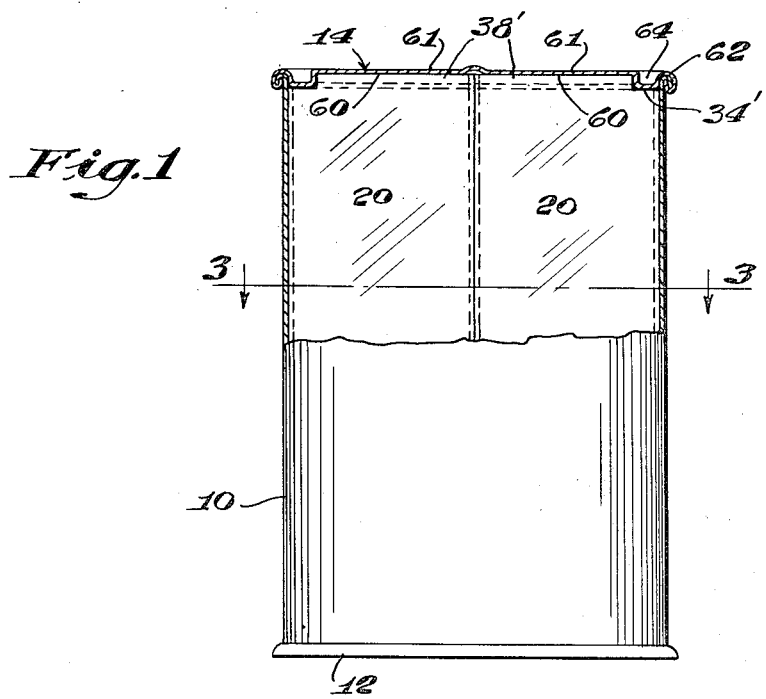
Fig. 1 is an elevational view of the container, partially in section.
Figures 2, 3:
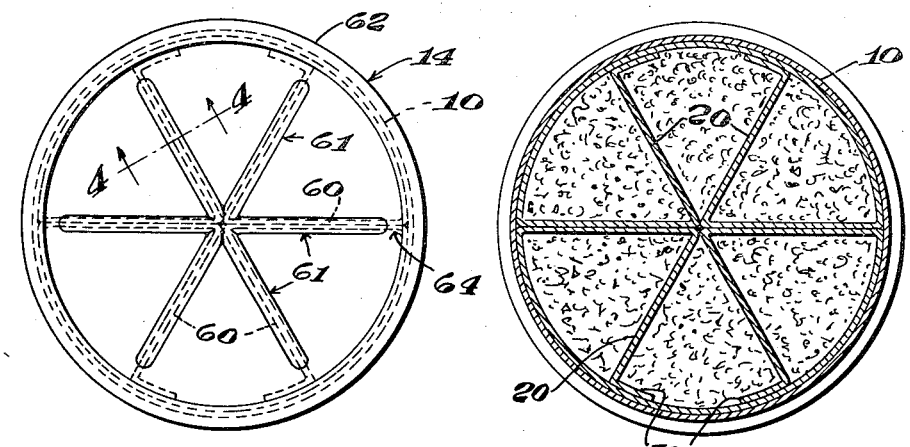
Fig. 2 is a plan view illustrating the top end structure.
Fig. 3 is a sectional view taken on line 3—3 of Fig. 1.
Figure 4:
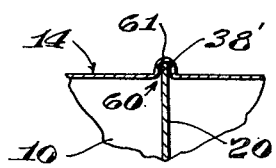
Fig. 4 is a partial sectional view taken on line 4—4 of Fig. 2.

Referring now to the drawings, I have illustrated therein a coffee package comprising a metal can or container 10 which is provided with end closures 12, 14. One end closure 12 may be of the type now employed in the construction of metal cans or containers now on the market, and the second end closure 14 is preferably of a special construction, as will be described, but which may be secured in airtight relation to the can in any usual or preferred manner, as by having the marginal portions thereof spun over the marginal lip of the body of the can as illustrated in Fig. 1. In practice the metal containers will be supplied to the coffee packer with special closure 14 secured to the body of the container, and the container will be filled through the remaining open end thereof.

In accordance with the present invention, the metal can, having the one end closure 14 affixed to one end thereof as above described to form an airtight closure therefor, is provided with a preformed compartment-forming lining which is preferably inserted into a can through the remaining open end thereof prior to the filling of the can and prior to the application to the open end of the can of the second closure 12. The compartment-forming lining is arranged to subdivide the interior of the container into a plurality of axially arranged compartments herein shown as six in number and which are preferably of equal volume. The compartment-forming liner is provided with partition members 20 of a length sufficient to engage the top and bottom closures for the body portion of the can when the closures are applied to form the airtight container, so that when the compartments have been filled with the coffee, the contents of each compartment are retained by the partition members and the corresponding portion of the body portion of the liner between the partition members, and little if any opportunity exists for leakage or seepage of the coffee from one compartment to an adjacent compartment and particularly when the different compartments are tightly or completely filled.

In the preferred form of liner, a sheet of cardboard is cut or died in the form illustrated in Fig. 9 wherein there is provided a died-out slot or opening 30 and died-out rectangular notches 31, 32 at the opposite side edges of the blank. The blank is further preferably scored vertically along the lines 34, 35 and along lines 36, 37 and 38, 39. The two side portions of the blank between the lines 36 and 38 and 37 and 39 respectively are cut along the lines 40, 41, and the blank is further scored along the dotted and folded lines 42 so that the upper and lower half sections of the blank may be folded one on the other, as will be described, along the folded lines 42.

From a blank of the construction described and illustrated in Fig. 9, the central portion of each half section of the blank is bent into semi-cylindrical shape to co-operate one with the other when the two half sections of the blank are subsequently folded along the lines 42 and into the position shown in Fig. 7 forming the cylindrical body portion of the liner. Referring again to Fig. 9, the two side portions of each half section of the blank are then folded along the score lines 35 and then again along the score lines 37, and finally the lips 50 are formed by folding on the lines 38 and 39 respectively, the lips being folded so that when the assembly shown in Fig. 5 is formed the lips are preferably extended toward one another. In the construction of the liner, the lips after being folded are adhesively secured to the cylindrical body portion of the liner in a position, as illustrated in Fig. 5, operating to hold the parts of each half section in fixed relation to one another.

The next step in the operation is to fold each section of the blank shown in Fig. 5 along the lines 42 in the manner illustrated in Fig. 6 and into the position shown in Fig. 7 wherein the central slotted portion 30 forms the top rim 34' of each half section of the cylindrical body portion of the liner, leaving upwardly projecting portions 38' of the partition members 20 extending above the cylindrical top rim 34' of the liner, such a structure being illustrated in Fig. 7. The projecting upper portions of the partition members are arranged to be received within radial grooves 60 extending radially from the central portion of the end closure 14 terminating a short distance from the interior of the bead 62, thus leaving an annular groove 64 which is continuous around the entire periphery of the end closure 14 to permit the usual tools employed in can-making machinery to be used in spinning the periphery of the closure to form the bead 62. The grooves 60 facilitate the registration of the multi-compartment liner with respect to the ribs 61 formed by the grooves 60 on the surface of the end closure 14. They also serve as stiffening members for the end closure.

As an alternative structure, I may prefer to form the liner of any of the commercially available plastics by either molding or extrusion operations, as will be apparent from inspection of Fig. 8, and as illustrated therein such a structure will preferably have its radial partitions 66 integral with each other at the center and integral with the cylindrical body 68 of the liner as illustrated. The upper portions of the partition members 66 are arranged to extend above the top of the cylindrical body of the liner so as to enable the upper portions to fit into the radial grooves forming the end closure 14.

In practice after the end closure 14 has been applied to the body of the can and the preformed compartment liner of the can has been introduced into the can and with the partitions projecting into the grooves 60, and prior to the application of the end closure 12, the lined can is then filled with coffee through the open end which ultimately is to form the bottom of the can. In practice the filling operation may preferably be performed in a commercially available filling machine of the vacuum or pressure types wherein the container is arranged to be moved into filling position and all of the compartments to be simultaneously filled with coffee. Preferably, the filling operation is conducted to form a "tightly filled" package as distinguished from "slack filled" package so that a solid body of coffee is disposed within each of the compartments completely filling the same and acts to reinforce not only the cylindrical body of the liner and also of the can but also to maintain the partition members in their position with their ends firmly and frictionally engaging the top and bottom end closures.

The lining unit is preferably constructed of a material possessing inherent flexibility or resiliency so that the lining unit may deform without breakage when subjected to compression by reason of the body portion of the can becoming dented during shipment or upon the development of excessive gas pressure within the container.

In opening the container an opener of the general type used in opening metal cans may be used to form an opening in the closure 14 between adjacent radial ribs 61 to thereby afford access to the particular compartment underlying said metal portion of the can top and enabling the contents of the particular compartment to be shaken out through the opening. When the container is composed of material other than metal, such an opening may be made without the use of special tools if so desired.

Experience has shown that the filling operation when conducted in a commercial form of vacuum filling machine and wherein the several compartments are simultaneously filled, the individual compartments each contain an amount of coffee which varies within exceedingly small limits from a predetermined weight with the result that the customer may introduce the predetermined weight of coffee into the coffee maker and be reasonably assured of the production of a coffee beverage of the requisite strength.

While the preferred embodiments of the invention have been herein illustrated and described, it will be understood that the invention may be embodied in other forms within the scope of the following claim.

Having thus described the invention, what is claimed is:

An airtight package, comprising: a metal container having an elongated cylindrical body portion and a first imperforate end closure member secured to one end of said body portion; a multi-compartment flexible lining unit disposed in said container, said lining unit being substantially cylindrical in shape and commensurate in length with said body portion and being insertable into said body portion through the opposite end thereof, said lining unit being open at at least said opposite end of said body portion and including radial partitions and arcuate portions interconnecting the outer ends of adjacent partitions for subdividing the interior of said body portion into a plurality of separate, segment-shaped compartments extending axially of the body portion and being substantially filled with a commodity; and a second imperforate end closure member secured to the opposite end of said body portion and retaining said lining unit and a commodity in position, one of said end closure members being secured by a projecting bead to said cylindrical body portion and having external raised ribs extending radially from its center and terminating short of said bead and providing grooves on the interior thereof, said radial partitions including portions projecting beyond the arcuate portions of the lining unit and into said radial grooves, said raised ribs serving as indicating means for indicating the position of the compartments within the container, whereby upon forming an opening between any two adjacent ribs, the contents of the underlying compartment can be removed through said opening.

(References on following page)

References Cited in the file of this patent

UNITED STATES PATENTS

| Number | Name | Date |
|---|---|---|
| 1,970,970 | Nolan | Aug. 21, 1934 |
| 2,073,635 | Holaubek | Mar. 16, 1937 |
| 2,096,825 | Roman | Oct. 26, 1937 |
| 2,149,713 | Webber | Mar. 7, 1939 |
| 2,459,940 | Himmel | Jan. 25, 1949 |
| 2,469,034 | Garris | May 3, 1949 |